United States Patent
Qian et al.

(10) Patent No.: US 10,824,785 B2
(45) Date of Patent: Nov. 3, 2020

(54) PCB STENCIL MANUFACTURING METHOD AND SYSTEM

(71) Applicant: VAYO (SHANGHAI) TECHNOLOGY CO., LTD., Shanghai (CN)

(72) Inventors: Shengjie Qian, Shanghai (CN); Fengshou Liu, Shanghai (CN); Jiuxuan Liu, Shanghai (CN); Jishuo Liu, Shanghai (CN)

(73) Assignee: VAYO (SHANGHAI) TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/066,496

(22) PCT Filed: Sep. 23, 2016

(86) PCT No.: PCT/CN2016/099799
§ 371 (c)(1),
(2) Date: Aug. 22, 2018

(87) PCT Pub. No.: WO2018/018736
PCT Pub. Date: Feb. 1, 2018

(65) Prior Publication Data
US 2019/0012421 A1    Jan. 10, 2019

(30) Foreign Application Priority Data

Jul. 26, 2016  (CN) .......................... 2016 1 0593972

(51) Int. Cl.
*G06F 30/392*    (2020.01)
*G06F 30/36*    (2020.01)
(Continued)

(52) U.S. Cl.
CPC ....... *G06F 30/392* (2020.01); *G05B 19/4099* (2013.01); *G06F 16/90335* (2019.01);
(Continued)

(58) Field of Classification Search
CPC ............ G06F 17/5072; G06F 17/5068; G06F 17/5063; G06F 16/90335; G06F 2217/40;
(Continued)

(56) References Cited

U.S. PATENT DOCUMENTS 5,781,447 A * 7/1998 Gerdes ............... H05K 13/0882
716/103
5,839,191 A * 11/1998 Economy ............ H01L 21/4853
29/843
(Continued)

FOREIGN PATENT DOCUMENTS

| CN | 101349909 A | 1/2009 |
|----|-------------|--------|
| CN | 102930114 A | 2/2013 |

(Continued)

*Primary Examiner* — Nha T Nguyen
(74) *Attorney, Agent, or Firm* — Global IP Services; Tianhua Gu

(57) ABSTRACT

A PCB stencil manufacturing method and system. The method comprises: inputting PCB stencil design information in a preset input format, the PCB stencil design information comprises solder pad element information; and converting the PCB stencil design information into corresponding system core data information, the system core data information comprises solder pad element packaging information, and the solder pad element packaging information comprises a solder pad element packaging pattern and solder pad element coordinates; and querying a stencil opening database according to the solder pad element packaging pattern, records in the stencil opening database comprise the following attributes: a solder pad element packaging pattern and a stencil opening pattern; and placing a stencil opening pattern
(Continued)

corresponding to a matching solder pad element packaging pattern to an opening layer according to the solder pad element coordinates.

14 Claims, 2 Drawing Sheets

(51) Int. Cl.
*G06F 30/39* (2020.01)
*G06F 16/903* (2019.01)
*G05B 19/4099* (2006.01)
*H05K 3/00* (2006.01)
*G06F 113/18* (2020.01)
*H05K 3/12* (2006.01)

(52) U.S. Cl.
CPC .............. *G06F 30/36* (2020.01); *G06F 30/39* (2020.01); *G06F 2113/18* (2020.01); *H05K 3/0005* (2013.01); *H05K 3/1225* (2013.01)

(58) Field of Classification Search
CPC ........ G06F 30/392; G06F 30/36; G06F 30/39; G06F 2113/18; G05B 19/4099; H05K 3/0005; H05K 3/1225
See application file for complete search history.

(56) References Cited

U.S. PATENT DOCUMENTS

| | | | | |
|---|---|---|---|---|
| 6,230,619 | B1 * | 5/2001 | Yamazaki | B41F 15/0813 101/129 |
| 6,317,513 | B2 * | 11/2001 | Michael | B23K 3/08 382/145 |
| 6,587,580 | B1 * | 7/2003 | Nikmanesh | H05K 3/1233 382/145 |
| 6,920,624 | B2 * | 7/2005 | Garrepally | G06F 17/5068 345/418 |
| 6,938,227 | B2 * | 8/2005 | Murphy | G06F 17/5068 716/102 |
| 7,003,871 | B2 * | 2/2006 | Ray | H05K 3/1225 29/825 |
| 9,323,880 | B2 * | 4/2016 | Madananth | G06F 17/5072 |
| 9,791,851 | B2 * | 10/2017 | Qian | G05B 19/418 |
| 10,426,039 | B2 * | 9/2019 | Zhang | H05K 3/0044 |
| 2004/0089413 | A1 * | 5/2004 | Murphy | G06F 17/5068 156/250 |
| 2005/0190959 | A1 * | 9/2005 | Kohler | G01R 31/2813 382/147 |
| 2008/0082949 | A1 * | 4/2008 | Schwartz | H05K 3/3484 700/109 |
| 2011/0130860 | A1 * | 6/2011 | Kelley | H05K 3/4638 700/121 |
| 2013/0021763 | A1 * | 1/2013 | Li | B23K 1/0016 361/760 |
| 2013/0092721 | A1 * | 4/2013 | Trelford | H05K 1/112 228/256 |
| 2013/0192482 | A1 * | 8/2013 | Bloom | B41F 15/08 101/127 |
| 2013/0263078 | A1 * | 10/2013 | Jeong | G06F 17/5081 716/136 |
| 2014/0210993 | A1 * | 7/2014 | Butler | G06T 3/00 348/87 |
| 2015/0045927 | A1 * | 2/2015 | Haugen | H05K 3/00 700/109 |
| 2015/0347658 | A1 * | 12/2015 | Madananth | G06F 17/5072 716/137 |
| 2017/0150610 | A1 * | 5/2017 | Zhang | H05K 3/1225 |
| 2017/0179069 | A1 * | 6/2017 | Carstens | B23K 1/0016 |
| 2017/0249400 | A1 * | 8/2017 | Oriordan | G06F 17/5077 |
| 2017/0301559 | A1 * | 10/2017 | Wang | H01L 21/4853 |
| 2018/0276331 | A1 * | 9/2018 | Hotra | H04B 17/3912 |

FOREIGN PATENT DOCUMENTS

| | | |
|---|---|---|
| CN | 102990179 A | 3/2013 |
| CN | 104765931 A | 7/2015 |
| CN | 104902691 A | 9/2015 |
| JP | 2001134627 A | 5/2001 |

* cited by examiner

PCB STENCIL MANUFACTURING METHOD AND SYSTEM

CROSS REFERENCE TO RELATED PATENT APPLICATION

The present application is the US national stage of PCT/CN2016/099799 filed on Sep. 23, 2016, which claims the priority of the Chinese patent application No. CN2016105939725 filed on Jul. 26, 2016, which application is incorporated herein by reference.

BACKGROUND OF THE PRESENT INVENTION

Field of Invention

The present invention relates to the technical field of electronic manufacturing, and in particular, to a PCB stencil manufacturing method and system.

Description of Related Arts

In the electronic manufacturing industry, stencils are basically manufactured by using a Gerber file, and are mostly manually manufactured. This manner makes it particularly easy to miss the opening, and consequently, after a stencil arrives at a factory, whether an opening of the stencil is correct or missed often needs to be manually checked through naked eyes. A traditionally preferred manufacturing manner generally includes the following steps: 1. Introduce a Gerber solder pad layer by using CircuitCAM or CAM350. 2. Manually check through naked eyes which solder pads are packaged. 3. Manually select a solder pad needing to be converted, and convert openings of the solder pad. 4. Check whether all openings are processed, and if the openings are not all processed, repeat step 2 to step 4. 5. Check through eyes whether the openings are rational and whether the openings are consistent with a PCB; if the openings are not rational or not consistent with the PCB, reprocess the openings of the solder pad; and if the openings are rational and consistent with the PCB, output stencil processing data. When the above method is used for manufacturing, N elements require N operations. Not only the method is extremely complex, but also an opening is easily missed. In addition, the introduced Gerber file must be correct; otherwise an error on the Gerber file can only be found when an actual PCB is compared at last, such as missing a solder pad. Generally, 3 to 4 hours is needed for processing a product with more than 1,000 elements by using such a method. With the development of electronic products in this industry, the pace of intelligent manufacturing has started, and concepts such as Industry 4.0, Internet plus, and intelligent factory have entered the entire manufacturing industry. A rapid and high-efficient manner will bring a revolutionary change to manufacturing.

In view of this, how to find a solution that can complete the stencil manufacturing more rapidly and efficiently has become an urgent problem to be resolved by those skilled in the art.

SUMMARY OF THE PRESENT INVENTION

In view of the foregoing defects of the prior art, an objective of the present invention is to provide a PCB stencil manufacturing method and system, to resolve the problem that the PCB stencil manufacturing in the prior art is cumbersome, time-consuming and error-prone.

To achieve the foregoing objective and other related objectives, the present invention provides a PCB stencil manufacturing method. The PCB stencil manufacturing method comprises: inputting PCB stencil design information in a preset input format, the PCB stencil design information comprises solder pad element information; and converting the PCB stencil design information into corresponding system core data information, the system core data information comprises solder pad element packaging information, and the solder pad element packaging information comprises a solder pad element packaging pattern and solder pad element coordinates; and querying a stencil opening database according to the solder pad element packaging pattern, records in the stencil opening database comprise the following attributes: a solder pad element packaging pattern and a stencil opening pattern; and placing a stencil opening pattern corresponding to a matching solder pad element packaging pattern to an opening layer according to the solder pad element coordinates.

Optionally, the preset input format comprises a PCB CAD file format or/and a Gerber file format.

Optionally, the solder pad element coordinates are CAD coordinates.

Optionally, the PCB stencil manufacturing method further comprises: inputting BOM (Bill of Material) information, the BOM information comprises a material code; adding the BOM information to the corresponding solder pad element packaging information; the attributes recorded in the stencil opening database further comprise a material code, querying the stencil opening database according to the material code, and placing a stencil opening pattern corresponding to a matching material code to the opening layer according to the solder pad element coordinates.

Optionally, the PCB stencil manufacturing method further comprises: the attributes recorded in the stencil opening database further comprise a packaging name, the solder pad element packaging information further comprises a packaging name; querying the stencil opening database according to the packaging name, and placing a stencil opening pattern corresponding to a matching packaging name to the opening layer according to the solder pad element coordinates.

Optionally, the PCB stencil manufacturing method further comprises: selecting a proper stencil opening conversion algorithm according to the solder pad element packaging information to perform opening conversion, so as to obtain a stencil opening pattern corresponding to the solder pad element.

Optionally, the PCB stencil manufacturing method further comprises: manually drawing the corresponding stencil opening pattern according to the solder pad element packaging information.

Optionally, the PCB stencil manufacturing method further comprises: adding the solder pad element information and the corresponding stencil opening pattern to the stencil opening database.

Optionally, the PCB stencil manufacturing method further comprises: checking all solder pad elements to ensure that all the solder pad elements have openings.

Optionally, the PCB stencil manufacturing method further comprises: outputting processed system core data information in a preset format as processing information of stencil manufacturing.

Optionally, the preset output format comprises a DXF file format or/and a Gerber file format.

The present invention further provides a PCB stencil manufacturing method. The PCB stencil manufacturing method comprises: inputting PCB stencil design information in a preset input format, the PCB stencil design information comprises solder pad element information; and converting the PCB stencil design information into corresponding system core data information, the system core data information comprises solder pad element packaging information, and the solder pad element packaging information comprises a solder pad element packaging name and solder pad element coordinates; and querying a stencil opening database according to the solder pad element packaging name, records in the stencil opening database comprise the following attributes: a solder pad element packaging name and a stencil opening pattern; and placing a stencil opening pattern corresponding to a matching solder pad element packaging name to an opening layer according to the solder pad element coordinates.

The present invention further provides a PCB stencil manufacturing method. The PCB stencil manufacturing method comprises: inputting PCB stencil design information in a preset input format, the PCB stencil design information comprises solder pad element information; and converting the PCB stencil design information into corresponding system core data information, the system core data information comprises solder pad element packaging information, and the solder pad element packaging information comprises a solder pad element material code and solder pad element coordinates; and querying a stencil opening database according to the solder pad element material code, records in the stencil opening database comprise the following attributes: a solder pad element material code and a stencil opening pattern; and placing a stencil opening pattern corresponding to a matching solder pad element material code to an opening layer according to the solder pad element coordinates.

The present invention further provides a PCB stencil manufacturing system. The PCB stencil manufacturing system comprises: a solder pad element information input module, configured to: input PCB stencil design information in a preset input format, the PCB stencil design information comprises solder pad element information; and convert the PCB stencil design information into corresponding system core data information, the system core data information comprises solder pad element packaging information, and the solder pad element packaging information comprises a solder pad element packaging pattern and solder pad element coordinates; and a solder pad element opening processing module, configured to: query a stencil opening database according to the solder pad element packaging pattern, records in the stencil opening database comprise the following attributes: a solder pad element packaging pattern and a stencil opening pattern; and place a stencil opening pattern corresponding to a matching solder pad element packaging pattern to an opening layer according to the solder pad element coordinates.

Optionally, the preset input format comprises a PCB CAD file format or/and a Gerber file format.

Optionally, the solder pad element coordinates are CAD coordinates.

Optionally, the solder pad element information input module is further configured to: input BOM (Bill of Material) information, the BOM information comprises a material code; and add the BOM information to the corresponding solder pad element packaging information; and the solder pad element opening processing module is further configured to: query the stencil opening database according to the material code, the attributes recorded in the stencil opening database further comprise a material code; and place a stencil opening pattern corresponding to a matching material code to the opening layer according to the solder pad element coordinates.

Optionally, the solder pad element opening processing module is further configured to: the attributes recorded in the stencil opening database further comprise a packaging name, the solder pad element packaging information further comprises a packaging name; query the stencil opening database according to the packaging name, and place a stencil opening pattern corresponding to a matching packaging name to the opening layer according to the solder pad element coordinates.

Optionally, the solder pad element opening processing module is further configured to select a proper stencil opening conversion algorithm according to the solder pad element packaging information to perform opening conversion, so as to obtain a stencil opening pattern corresponding to the solder pad element.

Optionally, the solder pad element opening processing module is further configured to manually draw the corresponding stencil opening pattern according to the solder pad element packaging information.

Optionally, the solder pad element opening processing module is further configured to add the solder pad element information and the corresponding stencil opening pattern to the stencil opening database.

Optionally, the solder pad element opening processing module is further configured to check all solder pad elements to ensure that all the solder pads have openings.

Optionally, the PCB stencil manufacturing system further comprises a processing result output module, configured to output processed system core data information in a preset format as processing information of stencil manufacturing.

Optionally, the preset output format comprises a DXF file format or/and a Gerber file format.

The present invention further provides a PCB stencil manufacturing system. The PCB stencil manufacturing system comprises: a solder pad element information input module, configured to: input PCB stencil design information in a preset input format, the PCB stencil design information comprises solder pad element information; and convert the PCB stencil design information into corresponding system core data information, the system core data information comprises solder pad element packaging information, and the solder pad element packaging information comprises a solder pad element packaging name and solder pad element coordinates; and a solder pad element opening processing module, configured to: query a stencil opening database according to the solder pad element packaging name, records in the stencil opening database comprise the following attributes: a solder pad element packaging name and a stencil opening pattern; and place a stencil opening pattern corresponding to a matching solder pad element packaging name to an opening layer according to the solder pad element coordinates.

The present invention further provides a PCB stencil manufacturing system. The PCB stencil manufacturing system comprises: a solder pad element information input module, configured to: input PCB stencil design information in a preset input format, the PCB stencil design information comprises solder pad element information; and convert the PCB stencil design information into corresponding system core data information, the system core data information comprises solder pad element packaging information, and the solder pad element packaging information comprises a solder pad element material code and solder pad element coordinates; and a solder pad element opening processing module, configured to: query a stencil opening database according to the solder pad element material code, records in the stencil opening database comprise the following attributes: a solder pad element material code and a stencil opening pattern; and place a stencil opening pattern corresponding to a matching solder pad element material to an opening layer according to the solder pad element coordinates.

As described above, the PCB stencil manufacturing method and system consistent with the present invention have the following beneficial effects: Usage of design data CAD and Gerber may be maximized. That is, the design data CAD and Gerber are accurately utilized for 100%, and accuracy reaches 100%. In addition, manual intervention is greatly reduced, and the PCB stencil manufacturing may be completed by using several simple steps, thereby saving more than 60% to 80% of the time. Knowledge requirements of an apparatus operator are not high, and a common operator can complete the PCB stencil manufacturing. The present invention changes the conventional working manner and implements automatic or semi-automatic generation of a solder pad element opening pattern during PCB stencil manufacturing. Not only manpower is greatly saved and the efficiency of stencil manufacturing is improved, but also accuracy of stencil manufacturing is improved, thereby the present invention has a relatively large advantage.

DESCRIPTION OF COMPONENT MARK NUMBERS

1: PCB stencil manufacturing system
11: Solder pad element information input module
12: Solder pad element opening processing module
S1-S2: Steps

DETAILED DESCRIPTION OF THE PREFERRED EMBODIMENTS

Implementations of the present invention are described in the following by using specific embodiments. Those skilled in the art can easily understand other advantages and effects of the present invention through contents disclosed in this specification. The present invention may alternatively be implemented or applied by using other different specific implementations. Various details in this specification may also be modified or changed based on a different idea or application without departing from the spirit of the present invention.

It should be noted that, figures provided in the present embodiments merely describe a basic concept of the present invention in a schematic manner, and therefore, the figures only show components related to the present invention, and are not drawn according to the numbers, shapes, and sizes of the components in an actual implementation. In an actual implementation, the shapes, numbers, and scales of the components may be a random change, and a layout of the components may be more complex.

Figure 1:
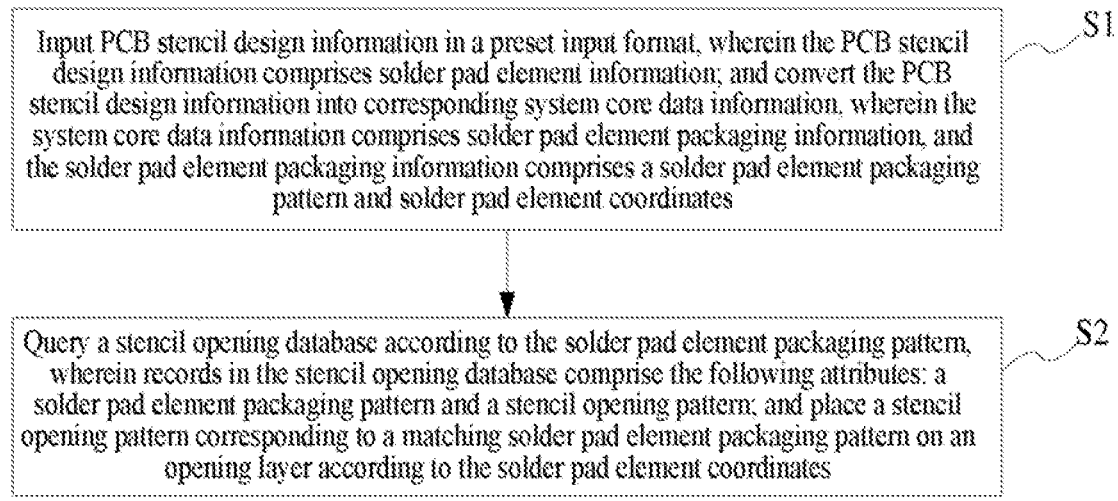
FIG. 1 is a schematic flowchart of an embodiment of a PCB stencil manufacturing method consistent with the present invention.

The present invention provides a PCB stencil manufacturing method. In an embodiment, as shown in FIG. 1, the PCB stencil manufacturing method comprises the following steps.

Step S1: Inputting PCB stencil design information in a preset input format, the PCB stencil design information comprises solder pad element information; and converting the PCB stencil design information into corresponding system core data information, the system core data information comprises solder pad element packaging information, and the solder pad element packaging information comprises a solder pad element packaging pattern and solder pad element coordinates. The preset input format comprises a PCB CAD file format or/and a Gerber file format. A Gerber file is a printed board processing file generated by circuit design software in a PCB circuit, and a suffix to the Gerber file comprises pho, gbr, art, gbx, or the like. The printed board processing file is used by a PCB factory for manufacturing. The Gerber format is a collection of document formats used by circuit board industry software to describe images and drilling and milling data of a circuit layer, a solder resist layer, a character layer, and other layers of a circuit board. A Gerber document is generally generated by a circuit board designer by using specialized electronic design automation (EDA) or CAD software. The Gerber document is delivered to the PCB factory and imported into CAM software, so as to provide data for each PCB technological process. The Gerber data may also be used for providing image data for a specific device, for example, an automated optical inspection device, or may be used for describing drilling information (an aperture is a flash).

Step S2: Querying a stencil opening database according to the solder pad element packaging pattern, records in the stencil opening database comprise the following attributes: a solder pad element packaging pattern and a stencil opening pattern; and placing a stencil opening pattern corresponding to a matching solder pad element packaging pattern to an opening layer according to the solder pad element coordinates. Specifically, the stencil opening pattern corresponding to the matching solder pad element packaging pattern in the stencil opening database is obtained according to similar pattern matching between the solder pad element packaging pattern in the core data and the solder pad element pattern in the stencil opening database (for example, a percentage may be set for a similarity, and if a similarity reaches 90% or more, the solder pad element packaging pattern in the core data and the solder pad element packaging pattern in the stencil opening database are considered to be matched). The solder pad element coordinates are CAD coordinates. In an embodiment, the PCB stencil manufacturing method further comprises: inputting BOM information, the BOM information comprises a material code; adding the BOM information to the corresponding solder pad element packaging information; the attributes recorded in the stencil opening database further comprise a material code, querying the stencil opening database according to the material code, and placing a stencil opening pattern corresponding to a matching solder pad element packaging pattern to the opening layer according to the solder pad element coordinates. The material code is a material code of a solder pad element. In an embodiment, the PCB stencil manufacturing method further comprises: the attributes recorded in the stencil opening database further comprise a packaging name, the solder pad element packaging information further comprises a packaging name; and querying the stencil opening database according to the packaging name, and placing a stencil opening pattern corresponding to a matching packaging name to the opening layer according to the solder pad element coordinates. The packaging name is a packaging name of a solder pad element.

Figure 3:
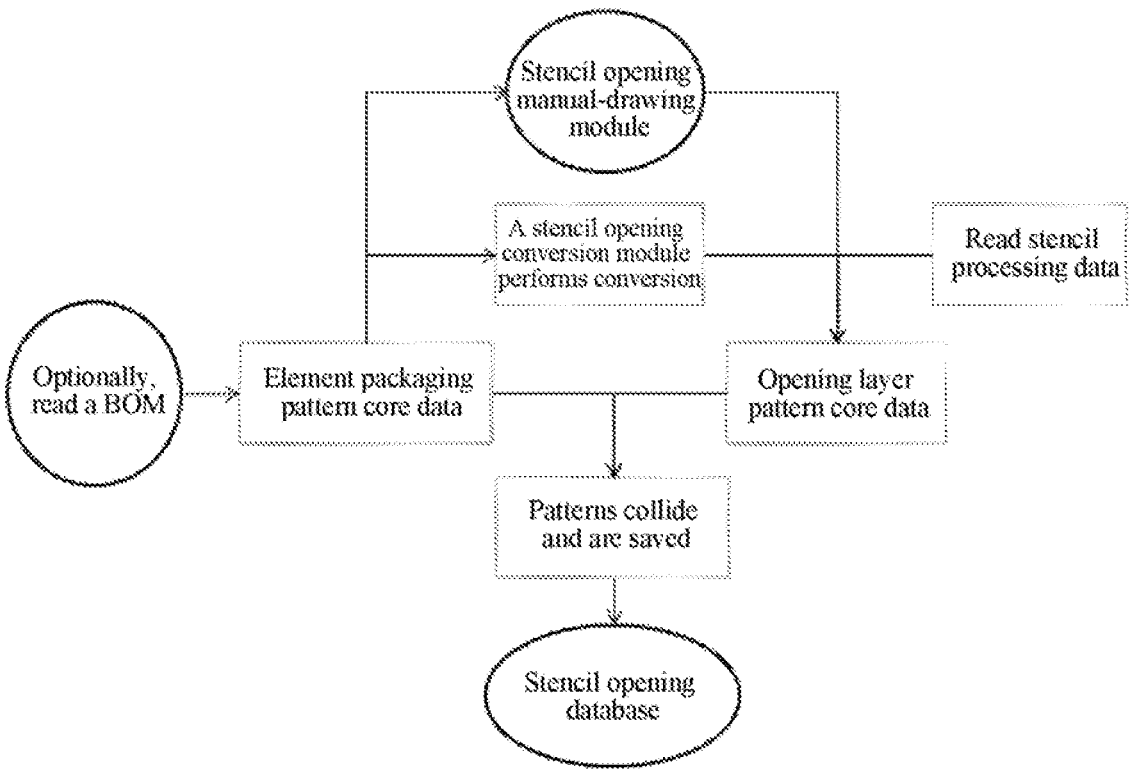
FIG. 3 is a schematic diagram of adding a record to a stencil opening database of another embodiment of a PCB stencil manufacturing method consistent with the present invention.

In an embodiment, the records in the stencil opening database comprise a solder pad element packaging pattern attribute (or referred to as an element packaging pattern attribute) and a stencil opening pattern attribute. As shown in FIG. 3, manners for adding a record of the stencil opening pattern to the stencil opening database include: In a first manner, stencil processing data (DXF, Gerber, or the like) is read into the opening layer, and a solder pad element packaging pattern and a corresponding stencil opening pattern in the opening layer are obtained. In a second manner, a stencil opening conversion module generates an opening in the opening layer, and a solder pad element packaging pattern and a corresponding stencil opening pattern in the opening layer are obtained. In a third manner, a stencil opening manual-drawing module generates an opening in the opening layer, and a solder pad element packaging pattern and a corresponding stencil opening pattern in the opening layer are obtained. The opening patterns of the three sources are saved to the stencil opening database according to opening patterns (stencil opening patterns) that the element packaging patterns of the core data of the opening layer collide with. In an embodiment, attributes recorded in the stencil opening database may further comprise a packaging name attribute and/or a material code attribute, and a corresponding packaging name and/or a corresponding material code may also be saved when the records are saved.

In an embodiment, the PCB stencil manufacturing method further comprises: selecting a proper stencil opening conversion algorithm according to the solder pad element packaging information to perform opening conversion, so as to obtain a stencil opening pattern corresponding to the solder pad element. The stencil opening conversion algorithm may be defined and added by a user. The stencil opening conversion algorithm is set according to related IPC standards. For example, the algorithm may change a size of a pattern, or cut four angles of a rectangle. A stencil opening conversion method may be flexibly added by means of updating the IPC standards. In an embodiment, the PCB stencil manufacturing method further comprises: manually drawing the corresponding stencil opening pattern according to the solder pad element packaging information. The PCB stencil manufacturing method further comprises: adding the solder pad element information and the corresponding stencil opening pattern to the stencil opening database.

In an embodiment, the PCB stencil manufacturing method further comprises: checking all solder pad elements to ensure that all the solder pads have openings. In an embodiment, the PCB stencil manufacturing method further comprises: outputting processed system core data information in a preset format as processing information of stencil manufacturing. The preset output format comprises a DXF file format or/and a Gerber file format. DXF is a CAD data file format developed by Autodesk for enabling CAD data exchange between AutoCAD and other software. DXF is an open vector data format and may be divided into two types: an ASCII format and a binary format. The ASCII format has well readability but occupies larger space; and the binary format occupies smaller space and has a rapid read speed. Currently, AutoCAD is the most popular CAD system, and therefore, DXF is widely used and becomes an actual standard. Most CAD systems can read or output a DXF file.

In an embodiment, the PCB stencil manufacturing method comprises: inputting PCB stencil design information in a preset input format, the PCB stencil design information comprises solder pad element information; and converting the PCB stencil design information into corresponding system core data information, the system core data information comprises solder pad element packaging information, and the solder pad element packaging information comprises a solder pad element packaging name and solder pad element coordinates; and querying a stencil opening database according to the solder pad element packaging name, records in the stencil opening database comprise the following attributes: a solder pad element packaging name and a stencil opening pattern; and placing a stencil opening pattern corresponding to a matching solder pad element packaging name to an opening layer according to the solder pad element coordinates. In an embodiment, a solder pad element that is not successfully matched by using the solder pad element packaging name may alternatively be matched by using a solder pad element material code or a solder pad element packaging pattern. When the matching does not succeed, a proper stencil opening conversion algorithm may be selected according to the solder pad element packaging information to perform opening conversion, so as to obtain a stencil opening pattern corresponding to the solder pad element, or the stencil opening pattern corresponding to the solder pad element is manually drawn.

In an embodiment, the PCB stencil manufacturing method comprises: inputting PCB stencil design information in a preset input format, the PCB stencil design information comprises solder pad element information; and converting the PCB stencil design information into corresponding system core data information, the system core data information comprises solder pad element packaging information, and the solder pad element packaging information comprises a solder pad element material code and solder pad element coordinates; and querying a stencil opening database according to the solder pad element material code, records in the stencil opening database comprise the following attributes: a solder pad element material code and a stencil opening pattern; and placing a stencil opening pattern corresponding to a matching solder pad element material code to an opening layer according to the solder pad element coordinates. In an embodiment, a solder pad element that is not successfully matched by using the solder pad element material code may alternatively be matched by using a solder pad element packaging name or a solder pad element packaging pattern. When the matching does not succeed, a proper stencil opening conversion algorithm may be selected according to the solder pad element packaging information to perform opening conversion, so as to obtain a stencil opening pattern corresponding to the solder pad element, or the stencil opening pattern corresponding to the solder pad element is manually drawn.

Figure 2:
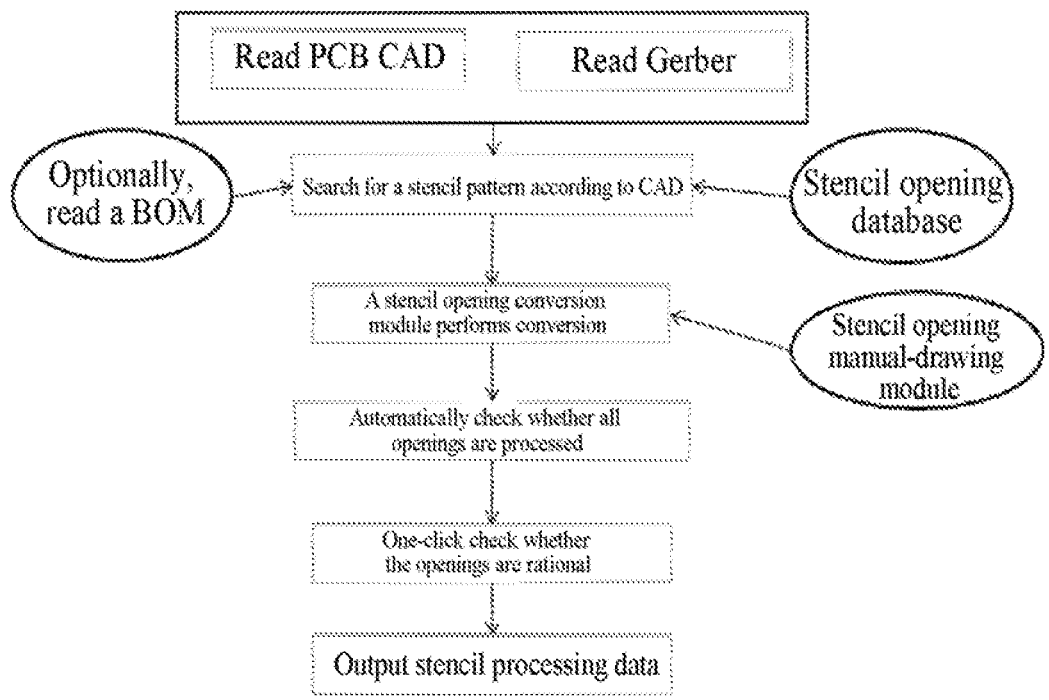
FIG. 2 is a schematic flowchart of another embodiment of a PCB stencil manufacturing method consistent with the present invention.

In an embodiment, as shown in FIG. 2, the PCB stencil manufacturing method comprises: reading a PCB CAD file, converting and saving the PCB CAD file as system core data. If there is Gerber layer data of a solder pad, Gerber is read and is converted into a to-be-converted stencil opening solder pad layer; or if there is not Gerber layer data of a solder pad, the Gerber layer data of the solder pad is extracted from the PCB CAD file as a to-be-converted stencil opening solder pad layer (or referred to as a stencil layer), and is saved as the system core data. Optionally, a BOM is read, and a material code in the BOM is combined with element information of CAD pattern data. The BOM assists production and management of an enterprise by using a computer. First, the computer is enabled to read composition of a product manufactured by the enterprise and all related materials. For ease of identification by the computer, a product structure that is represented by a figure must be converted into a certain data format, and such a file that describes the product structure by using the data format is the Bill of Material, that is, BOM. The BOM is a technical file that defines the product structure, and therefore, it is also referred to as a product structure table or a product structure tree.

In this case, key data in the system core data is core data CAD element layer, comprising: element coordinates, an element solder pad, element packaging, and element material code, and the to-be-converted stencil opening solder pad layer. The system core data comprises pattern display data and BOM data, and content of the system core data is the length, width, and thickness of a PCB, the element coordinates, an angle, and the material code. The BOM data and PCB data can be edited and browsed.

Pattern data of a stencil opening database comprises an element packaging pattern and a stencil opening pattern, and the stencil opening database further comprises character string data: a packaging name and/or a material code. Steps of CAD pattern packaging are listed in the following. 1: First, searching the stencil opening database according to the solder pad element packaging pattern, and placing a stencil opening pattern (also referred to as a steel mesh opening pattern) that is in the opening database and that has a matching pattern to an opening layer (that is, an opening solder pad layer) according to CAD coordinates. That is, a packaging pattern in the opening database is queried through the element packaging pattern, to find a packaging pattern satisfying a percentage requirement (for example, a percentage may be set to 98% by a user) of pattern similarity, and an opening pattern is generated to the opening layer. 2: The core data comprises a packaging pattern of a solder pad element, and the solder pad element has a packaging name and/or a material code. Performing searching according to the packaging name or the material code for a rest solder pad element that is not matched, and, placing the stencil opening pattern in the opening database to the opening layer according to the CAD coordinates for a solder pad element that is matched. Specifically, a material code character string in the opening database is queried according to the material code of the element, to find a consistent material code, and an opening pattern is generated to the opening layer. A packaging name character string in the opening database is queried according to the packaging name of the element, to find a consistent packaging name, and an opening pattern is generated in the opening layer. 3: Performing opening conversion by using a stencil opening conversion module (comprising a plurality of stencil opening conversion algorithms) and selecting a corresponding algorithm for a rest solder pad element. 4: Drawing an opening by using a stencil opening manual-drawing module for a rest solder pad element that is not supported by an algorithm, until solder pads of all elements have opening patterns. All the opening patterns in the foregoing steps may be saved in the stencil opening database for a next use.

The openings of solder pads are checked and inspected to check whether each solder pad of the element has an opening, so as to prevent missing an opening. Whether there is a surplus opening is checked in reverse. Alternatively, final stencil data may be compared with an original stencil pad and CAD to check whether an opening is missing or surplus. Specifically, all the elements in the core date are circulated, whether an opening pattern exists below the solder pad pattern of each element is checked, and if the opening pattern exists, the opening data is marked which element it belongs to, until circulation of all the element solder pads is completed. An opening on the opening layer that is not marked as belonging to an element solder pad is the surplus opening. An element solder pad without an opening below is an element solder pad missing an opening. At last, stencil processing data of stencil manufacturing apparatuses needs to be output by using files in different formats (for example, files in a DXF format, a Gerber format, or the like) according to the different apparatuses.

Figure 4:
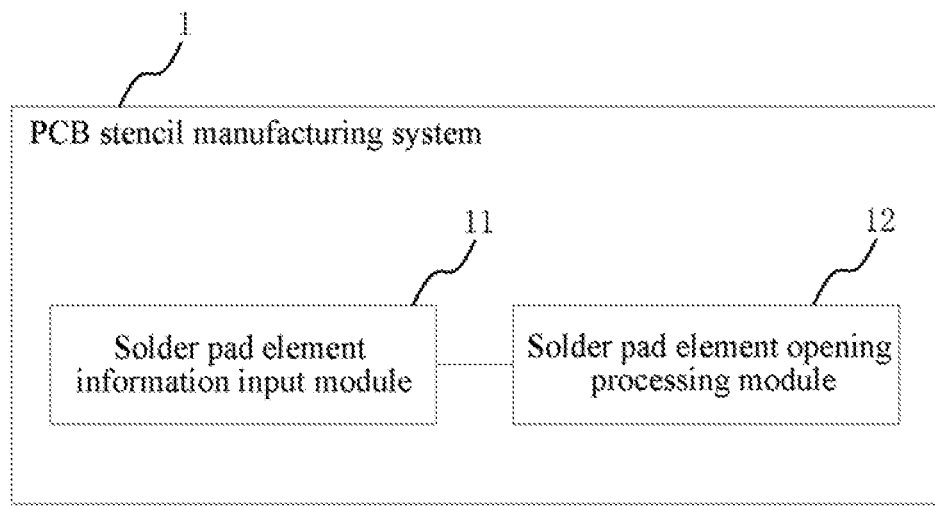
FIG. 4 is a schematic diagram of modules of an embodiment of a PCB stencil manufacturing system consistent with the present invention.

The present invention further provides a PCB stencil manufacturing system, and the PCB stencil manufacturing system may be applied to the foregoing PCB stencil manufacturing method. In an embodiment, as shown in FIG. 4, the PCB stencil manufacturing system 1 comprises a solder pad element information input module 11 and a solder pad element opening processing module 12. Wherein:

The solder pad element information input module 11 is configured to: input PCB stencil design information in a preset input format, the PCB stencil design information comprises solder pad element information; and convert the PCB stencil design information into corresponding system core data information, the system core data information comprises solder pad element packaging information, and the solder pad element packaging information comprises a solder pad element packaging pattern and solder pad element coordinates. The preset input format comprises a PCB CAD file format or/and a Gerber file format. In an embodiment, the older pad element information input module 11 further comprises: inputting BOM information, the BOM information comprises a material code; and adding the BOM information to the corresponding solder pad element packaging information.

The solder pad element opening processing module 12 is connected to the solder pad element information input module 11, and is configured to: query a stencil opening database according to the solder pad element packaging pattern, records in the stencil opening database comprise the following attributes: a solder pad element packaging pattern and a stencil opening pattern; and place a stencil opening pattern corresponding to a matching solder pad element packaging pattern to an opening layer according to the solder pad element coordinates. Specifically, similar pattern matching is performed according to the solder pad element packaging pattern in the core data and the solder pad element pattern in the stencil opening database (a percentage may be set for a similarity, and if a similarity reaches 90% or more, the solder pad element packaging pattern in the core data and the solder pad element packaging pattern in the stencil opening database are considered to be matched), to obtain the stencil opening pattern corresponding to the matching solder pad element packaging pattern in the stencil opening database. The solder pad element coordinates are CAD coordinates. The solder pad element opening processing module is further configured to: query the stencil opening database according to the material code, the attributes recorded in the stencil opening database further comprise a material code; and place a stencil opening pattern corresponding to a matching solder pad element packaging pattern to the opening layer according to the solder pad element coordinates. The material code is a material code of a solder pad element. In an embodiment, the solder pad element opening processing module is further configured to: the attributes recorded in the stencil opening database further comprise a packaging name, the solder pad element packaging information further comprises a packaging name; query the stencil opening database according to the packaging name, and place a stencil opening pattern corresponding to a matching packaging name to the opening layer according to the solder pad element coordinates. The packaging name is a packaging name of a solder pad element.

In an embodiment, the records in the stencil opening database comprise a solder pad element packaging pattern attribute (or referred to as an element packaging pattern attribute) and a stencil opening pattern attribute. As shown in FIG. 3, manners for adding a record of the stencil opening pattern to the stencil opening database include: In a first manner, stencil processing data (DXF, Gerber, or the like) is read into the opening layer, and a solder pad element packaging pattern and a corresponding stencil opening pattern in the opening layer are obtained. In a second manner, a stencil opening conversion module generates an opening in the opening layer, and a solder pad element packaging pattern and a corresponding stencil opening pattern in the opening layer are obtained. In a third manner, a stencil opening manual-drawing module generates an opening in the opening layer, and a solder pad element packaging pattern and a corresponding stencil opening pattern in the opening layer are obtained. The opening patterns of the three sources are saved to the stencil opening database according to opening patterns (stencil opening patterns) that the element packaging patterns of the core data of the opening layer collide with. In an embodiment, attributes recorded in the stencil opening database may further comprise a packaging name attribute and/or a material code attribute, and a corresponding packaging name and/or a corresponding material code may also be saved when the records are saved.

In an embodiment, the solder pad element opening processing module 12 is further configured to select a proper stencil opening conversion algorithm according to the solder pad element packaging information to perform opening conversion, so as to obtain a stencil opening pattern corresponding to the solder pad element. In an embodiment, the solder pad element opening processing module 12 is further configured to manually draw the corresponding stencil opening pattern according to the solder pad element packaging information. The solder pad element opening processing module 12 is further configured to add the solder pad element information and the corresponding stencil opening pattern to the stencil opening database. That is, the stencil opening pattern that corresponds to the solder pad element and that is obtained by means of performing the opening conversion according to the stencil opening conversion algorithm or the corresponding stencil opening pattern that is manually drawn according to the solder pad element packaging information is added to the stencil opening database.

In an embodiment, the solder pad element opening processing module 12 is further configured to check all solder pad elements to ensure that all the solder pads have openings. In an embodiment, the PCB stencil manufacturing system 1 further comprises a processing result output module. The processing result output module and the solder pad element opening processing module 12 are configured to output processed system core data information in a preset format as processing information of stencil manufacturing. The preset output format comprises a DXF file format or/and a Gerber file format. DXF is a CAD data file format developed by Autodesk for enabling CAD data exchange between AutoCAD and other software. DXF is an open vector data format and may be divided into two types: an ASCII format and a binary format. The ASCII format has well readability but occupies larger space; and the binary format occupies smaller space and has a rapid read speed. Currently, AutoCAD is the most popular CAD system, and therefore, DXF is widely used and becomes an actual standard. Most CAD systems can read or output a DXF file.

In an embodiment, the solder pad element information input module 11 is configured to: input PCB stencil design information in a preset input format, the PCB stencil design information comprises solder pad element information; and convert the PCB stencil design information into corresponding system core data information, the system core data information comprises solder pad element packaging information, and the solder pad element packaging information comprises a solder pad element packaging name and solder pad element coordinates. The solder pad element opening processing module 12 is configured to: query a stencil opening database according to the solder pad element packaging name, records in the stencil opening database comprise the following attributes: a solder pad element packaging name and a stencil opening pattern; and place a stencil opening pattern corresponding to a matching solder pad element packaging name to an opening layer according to the solder pad element coordinates. In an embodiment, a solder pad element that is not successfully matched by using the solder pad element packaging name may alternatively be matched by using a solder pad element material code or a solder pad element packaging pattern. When the matching does not succeed, a proper stencil opening conversion algorithm may be selected according to the solder pad element packaging information to perform opening conversion, so as to obtain a stencil opening pattern corresponding to the solder pad element, or the stencil opening pattern corresponding to the solder pad element is manually drawn.

In an embodiment, the solder pad element information input module 11 is configured to: input PCB stencil design information in a preset input format, the PCB stencil design information comprises solder pad element information; and convert the PCB stencil design information into corresponding system core data information, the system core data information comprises solder pad element packaging information, and the solder pad element packaging information comprises a solder pad element material code and solder pad element coordinates. The solder pad element opening processing module 12 is configured to: query a stencil opening database according to the solder pad element material code, records in the stencil opening database comprise the following attributes: a solder pad element material code and a stencil opening pattern; and place a stencil opening pattern corresponding to a matching solder pad element material code to an opening layer according to the solder pad element coordinates. In an embodiment, a solder pad element that is not successfully matched by using the solder pad element material code may alternatively be matched by using a solder pad element packaging name or a solder pad element packaging pattern. When the matching does not succeed, a proper stencil opening conversion algorithm may be selected according to the solder pad element packaging information to perform opening conversion, so as to obtain a stencil opening pattern corresponding to the solder pad element, or the stencil opening pattern corresponding to the solder pad element is manually drawn.

In conclusion, the PCB stencil manufacturing method and system consistent with the present invention change the conventional working manner and implement automatic or semi-automatic generation of a solder pad element opening pattern during PCB stencil manufacturing. Not only manpower is greatly saved and the efficiency of stencil manufacturing is improved, but also accuracy of stencil manufacturing is improved, thereby the present invention has a relatively large advantage. Therefore, the present invention effectively overcomes various defects in the prior art and has a high industry use value.

The above embodiments only exemplarily describe the principles and effects of the present invention, and are not intended to limit the present invention. Those skilled in the art may modify and change the embodiments without departing from the spirit and scope of the present invention. Therefore, all modifications and changes completed by those of ordinary skill in the art without departing from the spirit and technical ideas of the present invention should fall within the claims of the present invention.

What is claimed is:

1. A PCB stencil manufacturing method, wherein the PCB stencil manufacturing method comprises:
   inputting PCB stencil design information in a preset input format, the preset input format comprises a PCB CAD file format or/and a Gerber file format, the PCB stencil design information comprises solder pad element information;
   converting the PCB stencil design information into corresponding system core data information, the system core data information comprises solder pad element packaging information, and the solder pad element packaging information comprises a solder pad element packaging pattern, a solder pad element packaging name, a solder pad element material code and solder pad element coordinates;
   querying a stencil opening database according to the solder pad element packaging pattern, the solder pad element packaging name, or the solder pad element material code, recording the following attributes in the stencil opening database comprising: a solder pad element packaging pattern, a solder pad element packaging name, or a solder pad element material code, and a stencil opening pattern; and
   placing a stencil opening pattern corresponding to a matching solder pad element packaging pattern, a matching solder pad element material code, or a matching solder pad element packaging name to an opening layer according to the solder pad element coordinates; and
   inspecting the openings of solder pads to check whether each solder pad of the element has an opening to prevent missing an opening, and checking if the solder pad has a surplus opening in reverse;
   wherein adding the stencil opening pattern to the stencil opening database includes one of the following:
   reading stencil processing data into the opening layer, and obtaining a solder pad element packaging pattern and a corresponding stencil opening pattern in the opening layer;
   generating, by a stencil opening conversion module, an opening in the opening layer, and obtaining a solder pad element packaging pattern and a corresponding stencil opening pattern in the opening layer;
   obtaining a solder pad element packaging pattern and a corresponding stencil opening pattern in the opening layer by generating an opening in the opening layer;
   the opening patterns added by above manners are saved to the stencil opening database according to the stencil opening patterns that the element packaging patterns of the core data of the opening layer collide with.

2. The PCB stencil manufacturing method as in claim 1, wherein the PCB stencil manufacturing method further comprises: inputting BOM (Bill of Material) information, wherein the BOM information comprises a material code; adding the BOM information to the corresponding solder pad element packaging information; the attributes recorded in the stencil opening database further comprise a material code, querying the stencil opening database according to the material code, and placing a stencil opening pattern corresponding to a matching material code to the opening layer according to the solder pad element coordinates.

3. The PCB stencil manufacturing method as in claim 1, wherein the PCB stencil manufacturing method further comprises: the attributes recorded in the stencil opening database further comprise a packaging name, the solder pad element packaging information further comprises a packaging name; querying the stencil opening database according to the packaging name, and placing a stencil opening pattern corresponding to a matching packaging name to the opening layer according to the solder pad element coordinates.

4. The PCB stencil manufacturing method as in claim 1, wherein the PCB stencil manufacturing method further comprises: selecting a proper stencil opening conversion algorithm according to the solder pad element packaging information to perform opening conversion, so as to obtain a stencil opening pattern corresponding to the solder pad element.

5. The PCB stencil manufacturing method as in claim 4, wherein the PCB stencil manufacturing method further comprises: adding the solder pad element information and the corresponding stencil opening pattern to the stencil opening database.

6. The PCB stencil manufacturing method as in claim 1, wherein the PCB stencil manufacturing method further comprises: manually drawing a corresponding stencil opening pattern according to the solder pad element packaging information.

7. The PCB stencil manufacturing method as in claim 1, wherein the PCB stencil manufacturing method further comprises: outputting processed system core data information in a preset format as processing information of stencil manufacturing.

8. A PCB stencil manufacturing system, wherein the PCB stencil manufacturing system comprises:
   a solder pad element information input module, configured to: input PCB stencil design information in a preset input format, the preset input format comprises a PCB CAD file format or/and a Gerber file format, the PCB stencil design information comprises solder pad element information; and convert the PCB stencil design information into corresponding system core data information, the system core data information comprises solder pad element packaging information, and the solder pad element packaging information comprises a solder pad element packaging pattern, a solder pad element packaging name, a solder pad element material code and solder pad element coordinates;
   a solder pad element opening processing module, configured to: query a stencil opening database according to the solder pad element packaging pattern, the solder pad element packaging name, or the solder pad element material code, records in the stencil opening database comprise the following attributes: a solder pad element packaging pattern, a solder pad element packaging name, or a solder pad element material code, and a stencil opening pattern; place a stencil opening pattern corresponding to a matching solder pad element packaging pattern, a matching solder pad element material code, or a matching solder pad element packaging name to an opening layer according to the solder pad element coordinates; and inspect the openings of solder pads to check whether each solder pad of the element has an opening to prevent missing an opening, and check if the solder pad has a surplus opening in reverse;

wherein adding the stencil opening pattern to the stencil opening database includes one of the following:

reading stencil processing data into the opening layer, and obtaining a solder pad element packaging pattern and a corresponding stencil opening pattern in the opening layer;

generating, by a stencil opening conversion module, an opening in the opening layer, and obtaining a solder pad element packaging pattern and a corresponding stencil opening pattern in the opening layer;

obtaining a solder pad element packaging pattern and a corresponding stencil opening pattern in the opening layer by generating an opening in the opening layer;

the opening patterns added by above manners are saved to the stencil opening database according to the stencil opening patterns that the element packaging patterns of the core data of the opening layer collide with.

9. The PCB stencil manufacturing system as in claim 8, wherein the solder pad element information input module further comprises: inputting BOM (Bill of Material) information, the BOM information comprises a material code; and adding the BOM information to the corresponding solder pad element packaging information; and the solder pad element opening processing module is further configured to: query the stencil opening database according to the material code, the attributes recorded in the stencil opening database further comprise a material code, and place a stencil opening pattern corresponding to a matching material code to the opening layer according to the solder pad element coordinates.

10. The PCB stencil manufacturing system as in claim 8, wherein the solder pad element opening processing module is further configured to: the attributes recorded in the stencil opening database further comprise a packaging name, the solder pad element packaging information further comprises a packaging name; query the stencil opening database according to the packaging name, and place a stencil opening pattern corresponding to a matching packaging name to the opening layer according to the solder pad element coordinates.

11. The PCB stencil manufacturing system as in claim 8, wherein the solder pad element opening processing module is further configured to select a proper stencil opening conversion algorithm according to the solder pad element packaging information to perform opening conversion, so as to obtain a stencil opening pattern corresponding to the solder pad element.

12. The PCB stencil manufacturing system as in claim 11, wherein the solder pad element opening processing module is further configured to add the solder pad element information and the corresponding stencil opening pattern to the stencil opening database.

13. The PCB stencil manufacturing system as in claim 8, wherein the solder pad element opening processing module is further configured to manually draw the corresponding stencil opening pattern according to the solder pad element packaging information.

14. The PCB stencil manufacturing system as in claim 8, wherein the PCB stencil manufacturing system further comprises a processing result output module, configured to output processed system core data information in a preset format as processing information of stencil manufacturing.

\* \* \* \* \*